Oct. 9, 1962    E. CONSTANTOPES    3,057,104
SPONGE FISHING DEVICE
Filed April 10, 1961    2 Sheets-Sheet 2 inventor
Emmanuel Constantopes
By Lucke & Lucke 3,057,104
SPONGE FISHING DEVICE
Emmanuel Constantopes, Astoria, N.Y.
(65—15 38th Ave., Woodside 77, N.Y.)
Filed Apr. 10, 1961, Ser. No. 101,726
21 Claims. (Cl. 43—6.5)

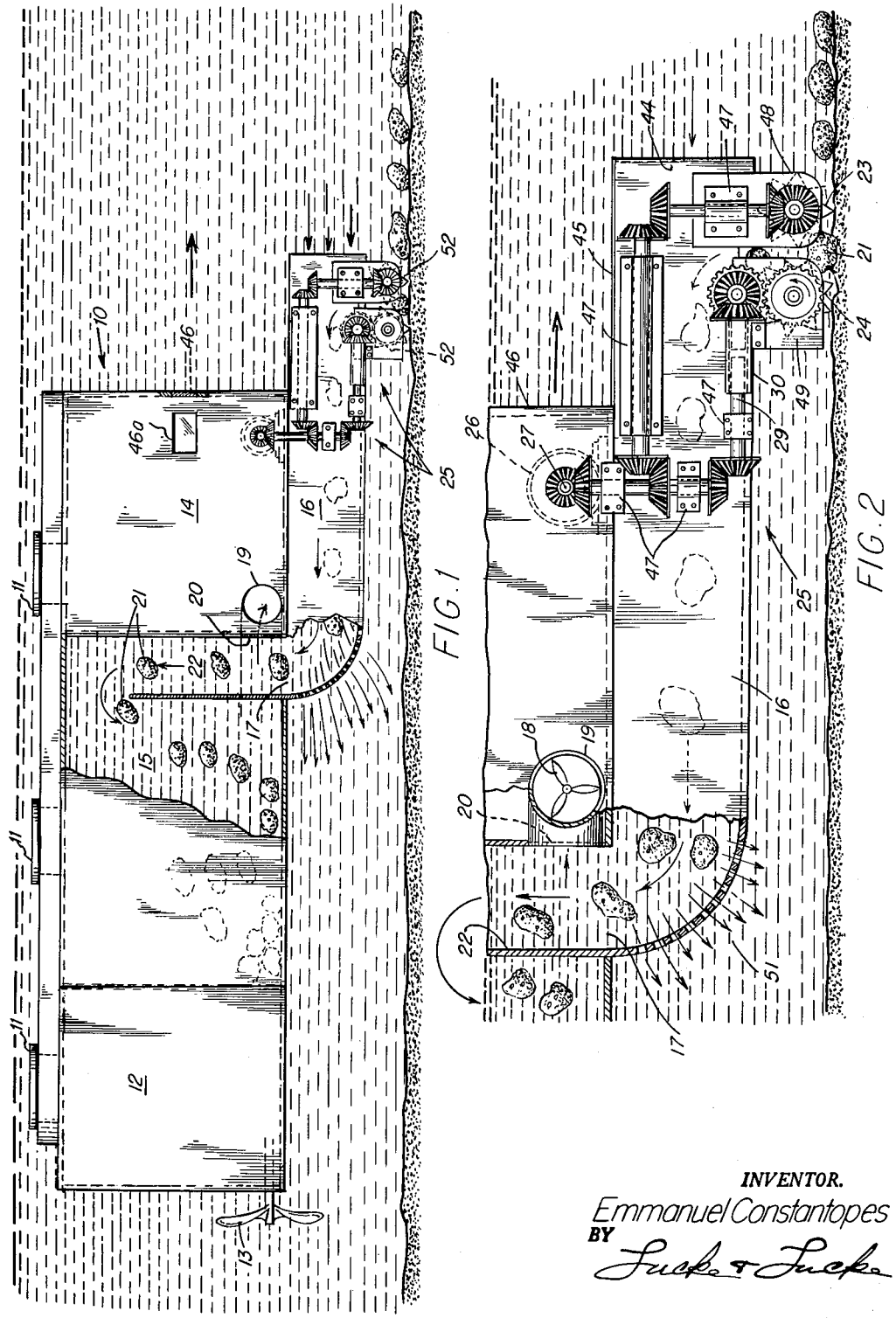

This invention relates to a rotatable gripping device. More particularly it relates to a device for fishing sponges and like objects from the depths of the sea, to which use, however, it is not restricted.

The ancient art of sponge fishing by detaching growing sponges from the bottom by means of a knife or sponge hook is still among the world's most hazardous occupations, the mortality rate of the divers being extremely high. Most usable sponges are found in the Caribbean or the Mediterranean Sea.

Florida spongers operate in the Gulf of Mexico within a very limited range of only 9 to 10 fathoms. Due to the strong current in the Gulf, it is too dangerous for divers to exceed the 10 fathom limit. Even in this restricted range, divers cannot stay down longer than five minutes at a time. It is known, however, that good sponges exist in this area up to 20 fathoms, beyond which they become too hard.

Since Caribbean sponges growing at depths of 3 to 9 fathoms are too soft to be useful, it is apparent that the vast majority of desirable sponges found in this region from 10 to 20 fathoms have so far been unobtainable, at least to any substantial degree. These fertile areas are ripe for exploitation, lacking only the means of safely and economically procuring sponges from them.

Although it is possible for a sponger to go down as far as 40 fathoms in the Mediterranean Sea and stay down longer than off the Florida coast, the annual losses of divers, either from being crippled or killed, is extremely high. Most accidents occur when safe fishing depths are exceeded.

The present invention contemplates a practical means for safely sponging at any desirable depth and for extended periods of time in hithertofore untouched undersea regions. This new means is an adjustable device which when attached to and operated from a specially built subboat can detach a sponge at any depth, hydraulically scoop it up and store it in a receiving tank in the boat until the day's operation is over.

The device essentially consists of a stainless steel subboat of the type which can maneuver vertically as well as propel itself forwardly and rearwardly underwater. This is usually done by electrically operated twin propellers disposed at either side of the rear of the boat and by fins located on either side of the boat. The sponger is seated in a front control compartment or cockpit having pressure-resistant windows through which the underwater terrain and sponges growing thereon are visible.

When a desirable sponge is sighted, the boat is brought down so as to locate the sponge between an opened pair of forwardly disposed large-toothed rollers or longitudinal grippers. The geared rollers are then closed to about one half the size of the sponge and rotated to erect the horizontal tissue before actual contact with it. After touching the ground, the rotary grippers are brought together or closed until the sponge is captured and tightly held between them. When firmly anchored on the sponge, the boat is alternately moved forwards and backwards until the sponge is detached or ripped loose. The grippers are then reversely and inwardly rotated to lift the loosened sponge into an overhead chute through which the sponge is drawn by suction into a water filled collecting tank or flood chamber disposed centrally in the boat.

The electric motors are operated by switches in the control room to run the large toothed grippers in either inwardly or outwardly direction for reasons hereinbelow set forth.

Further features and advantages of the invention will be apparent in the following detail description and the accompanying drawings which illustrate preferred embodiments of the invention, wherein FIG. 1 is a side elevation of a sponge fishing subboat showing the various compartments in diagrammatic form;

FIG. 2 is an enlarged view of the sponge detaching device shown in FIG. 1;

Figure 3:
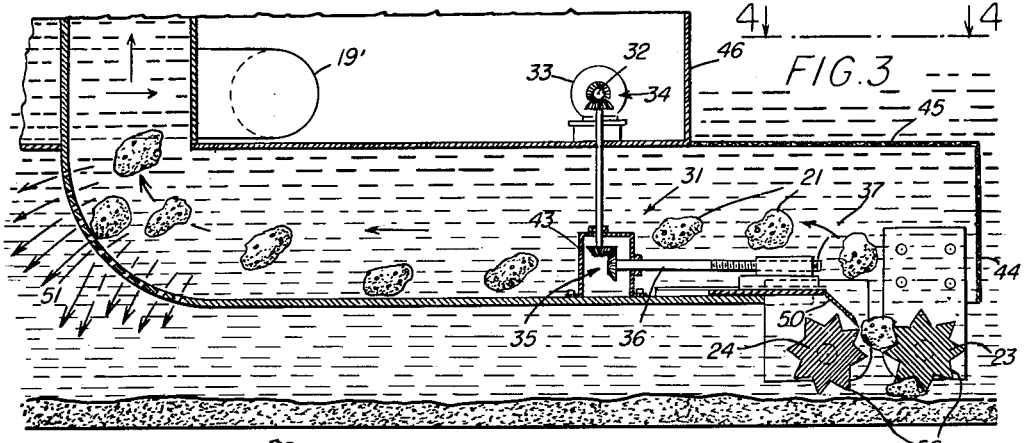
FIG. 3 is a sectional view of the forward portion of the device showing the means of regulating the distance between the adjustable and stationary sponge gripping rollers.

Referring now to the drawings, a 4-sided steel subboat generally designated 10 of any desired configuration is shown with three separate compartments, each having a water tight door or escape hatch 11.

The rear compartment 12 houses the electric motors (not shown) for operating twin propellers 13, one of which is located at either side of the craft. A surface boat covers the subboat in its undersea movements which provides air for the operator and an electric generating source connected by cable (not shown) to the motors. The propeller motors are operated for forward and reverse direction by switches (not shown) located in the forward compartment or control room 14.

The middle compartment consists of a tank or flood chamber 15. When the subboat is prepared to dive, the operator opens valves (not shown) which allow sea water to enter the tank through one or more pipes disposed on either side of a centrally disposed chute 16. The filled tank submerges the craft, after which it is directed about the bottom by selective use of one or both propellers 13 and raised or lowered by directional fins or flaps (not shown) disposed on either side of the craft in a conventional manner similar to those used on aircraft.

When the operator wishes to raise the boat to the surface he admits compressed air into the flood tank which forces the water out through the above mentioned pipes or exhausts 19, 19'. A propeller 18 is mounted in each of the exhaust pipes. If desired, propellers 18 may be used to hasten the ascent. Either propeller 18 may be operated individually to aid in turning the boat to the right or left when it is submerged. A screen 20 prevents loss of sponges 21, which enter the tank through a high walled passageway 22, from escaping through the exhausts when the water is expelled.

The sponges are pushed into the water filled chute 16 by means of two elongated rotary grippers or notched rollers which project forwardly and downwardly beyond the control room 14. A stationary roller 23 and an adjustable roller 24 disposed rearwardly thereof are rotated through a dual train of bevel gears, a pair of double gears or cog wheels and spindles generally designated 25. The gear train is driven by an electric motor 26 through spindle 27 disposed in the control room 14, see FIG. 2. Spindle 27 is reversibly mounted so that it can be switched by the operator into forward, sponge-intaking drive as shown in FIG. 3 or reversed into an outwardly directed thrust. The reversed drive of the rollers aid in lifting the craft out of a rut or depressed area.

The adjustable roller 24 is mounted on a movable floor 28 and maintained in rotatable position by a telescoping shaft 29 keyed within a grooved sleeve 30. Forward and rearward movement of roller 24 is controlled by another set of pinions generally designated 31 as shown in FIG. 3.

A pinion 32 powered by an electric motor 33 transmits forward or rearward motion by means of two sets of bevel gears 34, 35 to a shaft 36 having a threaded end 37 which is screwably mounted within a threaded bore 38 of boss 39. The boss is provided with an integral base plate 40 which is secured to movable floor 28 as by bolts 41 or the like.

When the distance between the two gripping rollers is altered as during a sponge retrieving operation, the movable platform 28, upon which the adjustable roller 24 is mounted is slid back and forth on tracks 42, 42'.

Figure 4:
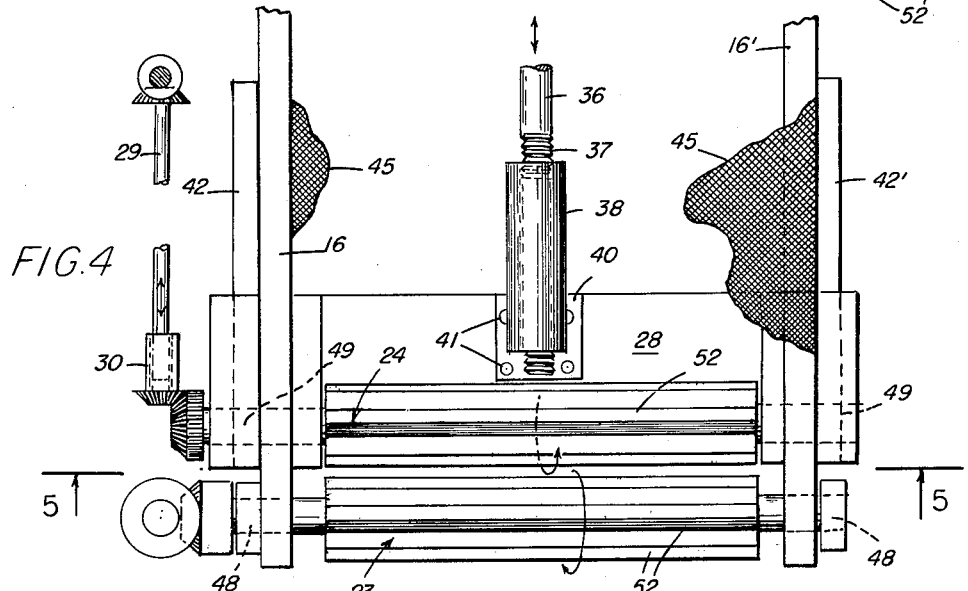
FIG. 4 is a fragmentary top plan view of the sponging device taken on line 4—4 of FIG. 3 showing an enlarged detailed view of the adjustable gripping roller mounted on its movable platform with the threaded means of longitudinally moving it and also the telescoping means for rotating it at any adjusted position.
Figure 5:
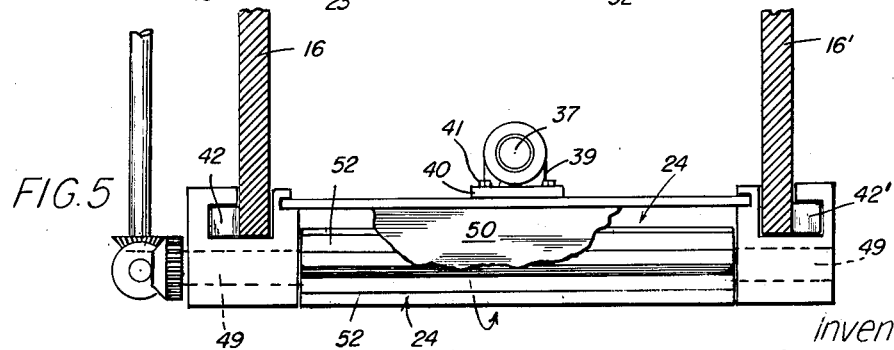
FIG. 5 is a sectional front elevation taken on line 5—5 of FIG. 4 showing the reciprocal moving platform with the rear roller partly broken away to reveal an apron for guiding sponges from the rollers up into the chute.

Means 31 for adjusting the position of movable gripper 24 is here shown disposed centrally of chute 16 and positioned within a housing 43 which is attached to the bottom of the chute. It may be preferred, however, to position movable means 31 to the right of the FIGS. 4 and 5 illustration in which case it may be attached to either the inner or outer surface of its steel side panel 16'.

Two steel wire screens, a front screen 44 and a top screen 45 allow free access of the surrounding water to enter into and prevent sponges escaping from the chute. At least the top screen is of wide enough mesh to afford complete visibility through a front glass panel 46 for a sponger to effectively control the various steps of maneuvering the subboat and grippers over a desired specimen in order to detach and boat it.

As previously stated, the showing of the subboat 10 is merely diagrammatic and not scaled to the proportionately larger showing of the sponging device attached thereto. For instance the boat would probably be between 16–20 feet long, with a 4½ foot beam and a depth of 5½ to 6 feet. On the other hand the associated mechanism including the gear trains attached to the chute are relatively smaller than shown since the gripping rollers positioned centrally of the craft, are about 2 to 2½ feet long and 2½ inches in diameter.

As shown in FIGS. 1 and 2, the roller rotating mechanism 25 is mounted to the outer surface of one side of chute 16 as by brackets 47.

The shafts of rotary grippers 23, 24 are journalled in bearings 48, 49 for long wearing, smooth operation. An apron or ramp 50 located above roller 24 catches and guides sponges when lifted by the inward rotation of the rollers into the chute, see FIG. 3.

Once in the chute the sponges are drawn inwardly into tank 15 through a suction action created by pumps or propellers 18 expelling water from exhausts 19. A sieve 51 is provided at the rear of the chute through which grit, stones and other relatively heavy foreign matter may be discarded.

As seen from the sectional view of FIG. 3 rollers 23, 24 are notched to form a ridged gripping surface or rows of parallel solid steel teeth 52 of substantially 50°–70° formation. The teeth on the two rollers, although complementary in formation, never actually engage, but are used merely to firmly anchor upon and loosen a sponge when captured between them.

In operation, the sponger enters the control room through the overhead door 11 and after fastening it, turns on the air line in the front compartment and opens the water intake valve to flood the middle compartment 15. After submerging, the power motors are switched on to operate single or twin propellers 13. Lateral fins are raised or lowered for four directional steering, i.e., up, down or to either side.

The operator or sponger seated before transparent windows 46, 46a directs the subboat to a sponge bed. The movable roller 24 is pulled manually or electrically away from stationary roller 23 by means of a wheel, lever or electric motor 33 and related mechanism. The boat is vertically lowered so that the sponge is positioned between the rollers when it rests on the bottom. The notched rollers are then rotated inwardly to uplift the floating membranes before closing in on the sponge which is then firmly clutched between teeth 52. With both gripping rollers "anchored" on the sponge, the boat is moved backwards and forwards to free the sponge. Once it is loosened, the rollers are again rotated to move the sponge upwardly over an apron 50 into chute 16 where it is drawn rearwardly and upwardly through centrally disposed inlet 22 into tank 15 with the inflow of water caused by pumps or propellers 18.

All of the working mechanism such as the gear trains, etc. will be preferably made of stainless steel and may or may not be encased in an outer protective housing. The boat may be made of painted steel plates.

The initial cost of the invention will be offset by the increased efficiency of catching sponges in vastly enlarged quantities and superlative quality by a single operator who is fully protected at all times.

The forms of the invention here described and illustrated are presented merely as examples of how the invention may be embodied and applied. Other forms, embodiments and applications of the invention, coming within the proper scope of the appended claims, will, of course, suggest themselves to those skilled in the art.

I claim:

1. For use with an electrically operative submersible boat having a stern inboard motor compartment, a midship floodable compartment including an inlet means thereto and an outlet means therefrom and a bow control compartment; a sponge catching device comprising a chute leading to said inlet having a top, bottom and two sides, an open end of said chute affording free access of surrounding water therein, a first roller depending from said open end, a movable platform disposed adjacent said first roller, a second roller carried by said platform, movable means for advancing and withdrawing said second roller relative to said first roller, and rotatable means for revolving said first and second rollers in inward and outward directions.

2. A sponge catching device according to claim 1 wherein said chute is secured to the hull of said boat, said open end projects forwardly of said control compartment and said top has a transparent portion extending outwardly from said control compartment.

3. A sponge catching device according to claim 2 wherein a first screen forms said transparent top portion and a second screen is provided to cover said open end.

4. A sponge catching device according to claim 1 wherein said movable means comprises an internally threaded boss disposed on said platform and a first shaft, said shaft having a threaded end rotatably mounted in said boss.

5. A sponge catching device according to claim 4 including a first bevel gear disposed at the opposite end of said first shaft to said threaded end, a second shaft, and a second bevel gear complementary to said first bevel gear, said second bevel gear disposed at one end of said second shaft for rotatably driving said first shaft.

6. A sponge catching device according to claim 5 having a third bevel gear disposed at the other end of said second shaft, a power source, and a pinion connected to said power source in said control compartment said pinion having meshing engagement with said third bevel gear for remote operation of said movable platform.

7. A sponge catching device according to claim 1 having tracks disposed exteriorly of said chute for guided movement of said platform thereon.

8. A sponge catching device according to claim 1 wherein said rollers are provided with rows of angular teeth thereon to grip a sponge when clamped therebetween.

9. A sponge catching device according to claim 1 wherein said outlet comprises an exhaust tube and a propeller mounted within said tube to eject water from said tank.

10. A sponge catching device according to claim 1 including a sieve disposed at the rear of said chute to prevent debris from entering said tank.

11. A sponge catching device according to claim 1 including an electric power source disposed in such control compartment, a first and second gear train, said gear trains when motivated by said electric source simultaneously rotating said rollers in opposite directions.

12. A sponge catching device according to claim 11 including a plurality of shafts, said first and second gear trains carried by said shafts, and bracket means securing said shafts to an outer surface of said chute.

13. A sponge catching device according to claim 11 wherein said first gear train comprises a first shaft, a second shaft disposed at right angles to said first shaft and three sets of bevel gears carried by said shafts, said first shaft transmitting power from said source through said second shaft to rotate said second roller in clockwise and anti-clockwise directions.

14. A sponge catching device according to claim 12, including a co-axial sleeve, means disposed in said sleeve and cooperating means disposed on said second shaft to telescopically mount the latter within said sleeve for rotating said second roller when said second shaft is in withdrawn or projected position within said sleeve.

15. A sponge catching device according to claim 14 wherein a key and groove form said means and said co-operating means.

16. A sponge catching device according to claim 11 wherein said second gear train comprises a first shaft, a second shaft disposed at right angles to said first shaft, a third shaft disposed parallel to said first shaft and four sets of bevel gears carried by said shafts, said first shaft transmitting power from said source through said second and third shafts to rotate said first roller in clockwise and anti-clockwise directions.

17. A sponge catching device according to claim 16 wherein said first shaft carries three bevel gears, a first bevel gear disposed at one end thereof being connected to said power source, a second bevel gear disposed at the other end of said shaft to drive said first gear train and a third bevel gear disposed intermediate the ends of said first shaft to drive said second gear train.

18. A sponge catching device according to claim 13 including a first cog wheel, the last bevel gear in said first gear train carried by said first cog wheel, and a second cog wheel carried by said second roller for meshing engagement with said first cog wheel.

19. A sponge catching device according to claim 1 including an apron depending from said platform, said apron guiding such sponges into said chute when lifted thereon by said rollers.

20. For use with an electrically operative submersible boat having an inboard motor compartment, a floodable compartment including an inlet means thereto and an outlet means therefrom and a control compartment; a sponge fishing device comprising a chute having a closed top, bottom and two sides leading to said inlet and an open end affording freely flowing water through said chute, a pair of rotary grippers for detaching a growing sponge and depositing it in said chute, adjustable means for regulating the position of one gripper relative to the other, rotatable means for revolving said grippers in opposite directions, said grippers revolving in an outwardly direction to lift said device from the water bed and revolving in an inwardly direction to lift a sponge into said chute, said rotatable means including a fixed gear train, an adjustable gear train and a single shaft carrying bevel gears at each end, and a third gear intermediate each said end to simultaneously rotate said fixed and adjustable gear trains in selected clockwise and anti-clockwise directions.

21. In combination, a submersible boat having a motor section, a floodable section and a control section and a sponge fishing device, comprising an open ended chute attached to said boat for conveying sponges into said floodable section, a pair of adjustable grippers for detaching and rotatably guiding such sponges into said chute, an outlet means disposed on each side of said boat, means disposed in each said outlet for selectively exhausting water from said tank to laterally steer said boat and for drawing such sponges into said tank.

References Cited in the file of this patent

UNITED STATES PATENTS

| | | |
|---|---|---|
| 1,997,149 | Lake | Apr. 9, 1935 |
| 2,385,895 | Tramontini | Oct. 2, 1945 |
| 2,414,055 | Miller | Jan. 7, 1947 |